(12) United States Patent
Kawai et al.

(10) Patent No.: US 11,433,730 B2
(45) Date of Patent: Sep. 6, 2022

(54) AIR SUSPENSION APPARATUS

(71) Applicant: Hitachi Astemo, Ltd., Ibaraki (JP)

(72) Inventors: Yoshinori Kawai, Ebina (JP); Hiroshi Sakai, Tama (JP); Kan Kobayashi, Yokohama (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 0 days.

(21) Appl. No.: 17/276,948

(22) PCT Filed: Sep. 18, 2019

(86) PCT No.: PCT/JP2019/036490
§ 371 (c)(1),
(2) Date: Mar. 17, 2021

(87) PCT Pub. No.: WO2020/066774
PCT Pub. Date: Apr. 2, 2020

(65) Prior Publication Data
US 2022/0032718 A1 Feb. 3, 2022

(30) Foreign Application Priority Data

Sep. 25, 2018 (JP) .............................. JP2018-178847

(51) Int. Cl.
*B60G 17/052* (2006.01)
*B60G 17/015* (2006.01)

(52) U.S. Cl.
CPC ....... *B60G 17/0525* (2013.01); *B60G 17/015* (2013.01); *B60G 2202/152* (2013.01);
(Continued)

(58) Field of Classification Search
CPC .............. B60G 17/0525; B60G 17/015; B60G 2202/152; B60G 2202/154; B60G 2500/202; B60G 2500/205; B60G 2600/26
See application file for complete search history.

(56) References Cited

U.S. PATENT DOCUMENTS 6,726,189 B2 * 4/2004 Folchert ............. B60G 17/0523
267/64.16
10,449,820 B2 * 10/2019 Iyoda ...................... F15B 11/16
(Continued)

FOREIGN PATENT DOCUMENTS

CN 108431415 A * 8/2018 .............. F04B 39/16
DE 10 2017 001 710 8/2018
(Continued)

OTHER PUBLICATIONS

Hayashi Kenji, 'Machine Translation of JP 2002087040 A Obtained Jan. 25, 2022', Mar. 26, 2002, Entire Document (Year: 2002).*
(Continued)

*Primary Examiner* — James A English
*Assistant Examiner* — Scott F. Underwood
(74) *Attorney, Agent, or Firm* — Wenderoth, Lind & Ponack, L.L.P.

(57) ABSTRACT

An air suspension apparatus includes a compressor configured to compress air, a tank configured to store the air, a tank-side suction conduit configured to supply the compressed air in this tank to an intake side of the compressor, a tank conduit connecting a discharge side of the compressor and the tank, an air suspension connected to the discharge side of the compressor via an air drier, an intake electromagnetic valve provided in the tank-side suction conduit, a return electromagnetic valve provided in the tank conduit, and a discharge conduit provided so as to branch off from between the discharge side of the compressor and the air
(Continued)

drier and configured to be connected to an atmosphere by opening a discharge electromagnetic valve.

4 Claims, 8 Drawing Sheets

(52) U.S. Cl.
CPC .. *B60G 2202/154* (2013.01); *B60G 2500/202* (2013.01); *B60G 2500/205* (2013.01); *B60G 2600/26* (2013.01)

(56) References Cited

U.S. PATENT DOCUMENTS

| | | |
|---|---|---|
| 2011/0203687 A1 | 8/2011 | Sprengel et al. |
| 2017/0151849 A1* | 6/2017 | Ohashi ............... B60G 17/0157 |
| 2019/0176562 A1 | 6/2019 | Ohashi et al. |
| 2021/0129616 A1 | 5/2021 | Eggebrecht |

FOREIGN PATENT DOCUMENTS

| | | | | |
|---|---|---|---|---|
| DE | 11 2017 003 031 | | 3/2019 | |
| JP | 2002-87040 | | 3/2002 | |
| JP | 2002087040 A | * | 3/2002 | |
| JP | 2009-046027 | | 3/2009 | |
| JP | 2011-168271 | | 9/2011 | |
| WO | WO-2017187829 A1 | * | 11/2017 | ........... B01D 53/047 |

OTHER PUBLICATIONS

International Search Report dated Oct. 21, 2019 in International Application No. PCT/JP2019/036490, with English Translation.
Written Opinion of the International Searching Authority dated Oct. 21, 2019 in International Application No. PCT/JP2019/036490, with English Translation.
Office Action dated Feb. 16, 2022 in corresponding German Patent Application No. 11 2019 004 801.5, with English translation.
Office Action dated Jun. 21, 2022 in corresponding Japanese Patent Application No. 2020-548537, with machine translation.

* cited by examiner

AIR SUSPENSION APPARATUS

TECHNICAL FIELD

The present invention relates to an air suspension apparatus mounted on a vehicle, such as a four-wheeled automobile.

BACKGROUND ART

Air suspension apparatuses for adjusting the vehicle height of a vehicle come in an open type and a closed type, and the open-type air suspension apparatuses have a simple system configuration and bring an advantage of being able to reduce the number of components. However, the open-type air suspension apparatuses compress air from an atmospheric-pressure state, thereby undesirably taking time to increase the pressure of the compressed air to a desired pressure. On the other hand, the closed-type air suspension apparatuses (for example, refer to PTL 1) can increase the pressure of the suction air to a higher pressure than the atmospheric pressure, thereby bringing an advantage of being able to increase the pressure of the compressed air to the desired pressure in a short time.

CITATION LIST

Patent Literature

PTL 1: Japanese Patent Application Public Disclosure No. 2011-168271

SUMMARY OF INVENTION

Technical Problem

However, PTL 1 is configured to switch the flow direction of the compressed air with use of an expensive three-way electromagnetic valve, thereby raising a problem of, for example, easily causing a leak of the compressed air in the tank and also increasing the manufacturing cost. Further, PTL 1 has a problem of being not necessarily able to improve the efficiency regarding the regeneration of the air drier.

Solution to Problem

An object of the present invention is to provide an air suspension apparatus that reduces a leak of compressed air and allows an air drier to be efficiently regenerated.

According to one aspect of the present invention, an air suspension apparatus includes a compressor configured to compress air, a tank configured to store the air, a first passage configured to supply the compressed air in this tank to a suction side of the compressor, a second passage connecting a discharge side of the compressor and the tank, an air suspension connected to the discharge side of the compressor via an air drier, a first valve provided in the first passage, a second valve provided in the second passage, and a third passage provided so as to branch off from between the discharge side of the compressor and the air drier and configured to be connected to an atmosphere by opening a third valve. The drier can be regenerated via the compressed air in the air suspension by closing the first valve and the second valve and opening the third valve.

Advantageous Effects of Invention

According to the one aspect of the present invention, the air suspension apparatus can efficiently regenerate the air drier and can also reduce the leak of the compressed air.

DESCRIPTION OF EMBODIMENTS

Figure 1:
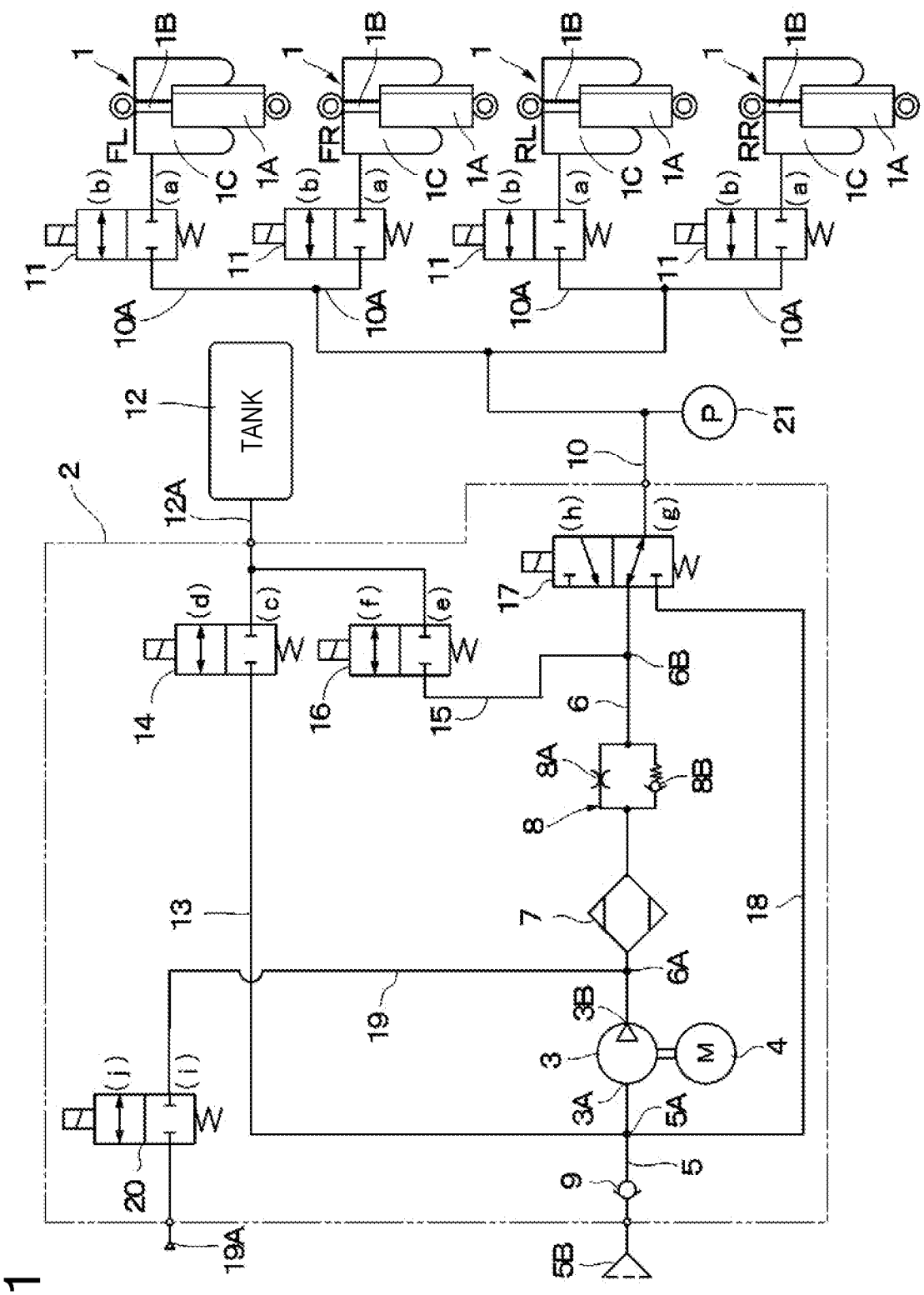
FIG. 1 is a circuit diagram illustrating the entire configuration of an air suspension apparatus according to a first embodiment of the present invention.

In the following description, air suspension apparatuses according to embodiments of the present invention will be described in detail with reference to the accompanying drawings, FIGS. 1 to 8, based on an example in which the air suspension apparatuses are applied to a vehicle such as a four-wheeled automobile.

Now, FIGS. 1 to 6 illustrate a first embodiment. In the drawings, four air suspensions 1 in total are provided on the front left wheel (FL), front right wheel (FR), rear left wheel (RL), and rear right wheel (RR) sides of the vehicle between each axle side and the vehicle body side of the vehicle (neither of them is illustrated). These air suspensions 1 are pneumatic devices that each adjust the vehicle height according to expansion and compression of an air chamber 1C due to supply/discharge of compressed air into/from the air chamber 1C, which will be described below.

Each of the air suspensions 1 includes a cylinder 1A, a piston rod 1B, and the air chamber 1C. The cylinder 1A is attached to, for example, the axle side of the vehicle. The piston rod 1B protrudes from inside this cylinder 1A axially extendably and compressibly, and the protrusion end side thereof is attached to the above-described vehicle body side. The air chamber 1C is provided extendably and compressibly between the protrusion end side of this piston rod 1B and the cylinder 1A, and functions as a pneumatic spring. The air chamber 1C of each of the air suspensions 1 is axially expanded/compressed due to the supply/discharge of the compressed air from/to a branch pipe 10A, which will be described below. At this time, each of the air suspensions 1 adjusts the height of the vehicle (the vehicle height) according to the supplied/discharged amount of the above-described compressed air with the piston rod 1B axially extending/compressing from/into inside the cylinder 1A.

A compressor device 2 is a device that compresses air and supplies the compressed air to the air chamber 1C of the air suspension 1. Now, the compressor device 2 includes a compressor 3, an electric motor 4, an intake conduit 5, a supply/discharge conduit 6, an air drier 7, a slow-return valve 8, an intake valve 9, which will be described below, a tank-side suction conduit 13, an intake electromagnetic valve 14, a tank conduit 15, a return electromagnetic valve 16, a supply/discharge switching valve 17, a return flow conduit 18, a discharge conduit 19, a discharge electromagnetic valve 20, and the like. The compressor 3 serves as a compressor main body. The electric motor 4 drives and stops this compressor 3. The intake conduit 5 is connected to a suction side 3A of the compressor 3 (hereinafter referred to as an intake side 3A). The supply/discharge conduit 6 is connected to a discharge side 3B of the compressor 3. The air drier 7 and the slow-return valve 8 are provided in this supply/discharge conduit 6.

The compressor 3 as the compressor main body generates the compressed air while sucking the air from the intake side 3A thereof, and is formed by, for example, a reciprocating compressor or a scroll compressor. The compressed air generated from the compressor 3 is supplied to the air chamber 1C of the air suspension 1, which is the pneumatic device. The compressor 3 is rotationally driven by the electric motor 4 serving as a driving source. The driving and stop of the electric motor 4 are controlled by a controller 22 (refer to FIG. 2), which will be described below. For example, a driving source such as a linear motor may be used as the electric motor 4.

The intake conduit 5 is connected to the intake side 3A of the compressor 3, and the supply/discharge conduit 6 is connected to the discharge side 3B of the compressor 3. One end side and the other end side of this supply/discharge conduit 6 are connected to the discharge side 3B of the compressor 3 and an air duct 10 via the supply/discharge switching valve 17, which will be described below, respectively. The air drier 7 and the slow-return valve 8 are provided at intermediate positions of the supply/discharge conduit 6.

The intake conduit 5 of the compressor device 2 forms an intake passage of the compressor 3, and the tank-side suction conduit 13 and the return flow conduit 18, which will be described below, are connected to a position of a connection point 5A. It is apparent that the tank-side suction conduit 13 and the return flow conduit 18 may be separately connected to the intake conduit 5 in front of and/or behind the connection point 5A.

An intake port 5B, which is opened to outside the compressor device 2 (the compressor 3), is formed on one end side of the intake conduit 5, and a filter for removing dust in the air (not illustrated) is provided to this intake port 5B. The intake port 5B is a port for causing the intake side 3A to suck external air when the compressor 3 is driven. The other end side of the intake conduit 5 is connected to the intake side 3A of the compressor 3, and the intake valve 9 is provided on the way of the intake conduit 5.

The intake valve 9 is provided between the connection point 5A and the intake port 5B on the way of the intake conduit 5. This intake valve 9 is a check valve configured to suck the air from the atmosphere via the intake port 5B. More specifically, the intake valve 9 formed by the check valve is configured to be opened and suck the air from outside (the atmosphere) via the intake port 5B when the pressure at the intake side 3A of the compressor 3 matches or falls below the atmospheric pressure at the position of the connection point 5A.

The intake valve 9 functions as a so-called suction valve, and is formed by a check valve that permits the air to flow from the intake port 5B toward inside the intake conduit 5 (i.e., the connection point 5A side of the intake conduit 5) and prohibits the air from flowing in the opposite direction. Therefore, when the pressure in the intake conduit 5 (i.e., at the connection point 5A side of the intake conduit 5) becomes a higher pressure (a positive pressure) than the atmospheric pressure, the intake valve 9 is brought into a closed state, and the compressed air is supplied (sucked) from the air suspension 1 or the tank 12 to the intake side 3A of the compressor 3 via the tank-side suction conduit 13 and the intake electromagnetic valve 14 or the return flow conduit 18.

The supply/discharge conduit 6 forms a supply/discharge passage that supplies/discharges the compressed air generated from the compressor 3 into/from the air chamber 1C of the air suspension 1. The compressed air supplied to the air chamber 1C of the air suspension 1 is discharged from the air chamber 1C via the supply/discharge conduit 6 and an orifice 8A of the slow return valve 8 so as to, for example, flow backward in the air drier 7 or be released into the tank 12, which will be described below, via the tank conduit 15 and the return electromagnetic valve 16, when the vehicle height is lowered.

Further, the discharge conduit 19 is provided to the supply/discharge conduit 6 so as to branch from a connection point 6A located between the discharge side 3B of the compressor 3 and the air drier 7. The tank conduit 15 is provided so as to branch from a connection point 6B of the supply/discharge conduit 6 that is located between the slow-return valve 8 and the supply/discharge switching valve 17. In other words, the air drier 7 and the slow-return valve 8 are provided in the supply/discharge conduit 6 at positions located between the connection points 6A and 6B.

The air drier 7 forms an air drying unit provided by being interposed on the way of the supply/discharge conduit 6. This air drier 7 includes a moisture absorbent such as silica gel (not illustrated) built therein, and is arranged between the discharge side 3B of the compressor 3 and the slow-return valve 8. The slow-return valve 8 is formed by a parallel circuit of the orifice 8A and a check valve 8B, and does not reduce the flow rate of the compressed air with the check valve 8B opened for the forward flow, which will be described below. However, the check valve 8B is closed for the backward flow, and the compressed air at this time is subjected to a reduction in the flow rate thereof due to the orifice 8A and therefore flows backward slowly at a low flow rate inside the air drier 7.

When the high-pressure compressed air generated in the compressor 3 flows in the forward direction in the supply/discharge conduit 6 toward the air suspension 1 side, the air drier 7 absorbs moisture by causing this compressed air to contact the internal moisture absorbent, and supplies the dried compressed air toward the air chamber 1C. On the other hand, when the compressed air (exhaust air) discharged from the air suspension 1 (the air chamber 1C) flows in the backward direction in the air drier 7 (the supply/discharge conduit 6), the dried air flows backward in the air drier 7 and therefore the moisture is desorbed from the moisture absorbent in the air drier 7 due to this dried air. As a result, the moisture absorbent in the air drier 7 is regenerated, and is returned to a state capable of absorbing moisture again.

The air chamber 1C in the air suspension 1 is connected to the supply/discharge conduit 6 of the compressor 3 via the air duct 10 and the supply/discharge switching valve 17. Then, a plurality of branch pipes 10A (for example, four branch pipes 10A) is provided in the air duct 10 so as to branch from one another. The distal end side of each of the branch pipes 10A is individually detachably connected to the air chamber 1C of the air suspension 1. Further, a fourth passage connecting the air drier 7 and the air suspension 1 is formed by, for example, a part of the supply/discharge conduit 6 and the air duct 10, and a fourth valve (the supply/discharge switching valve 17, which will be described below) is provided in this fourth passage.

A supply/discharge valve 11 of the compressed air is provided on the way of each of the branch pipes 10A to control the supply/discharge of the compressed air into/from the air chamber 1C of the air suspension 1. The supply/discharge valve 11 is formed by, for example, a two-port and two-position electromagnetic switching valve (a solenoid valve). The supply/discharge valve 11 is normally placed at a valve-closed position (a), and is switched from the valve-closed position (a) to a valve-opened position (b) when being energized according to a control signal from the controller 22, which will be described below.

Each of the supply/discharge valves 11 may be configured to be provided in connection with between the air chamber 1C of the air suspension 1 and the branch pipe 10A. Further, the supply/discharge valve 11 has a function as a relief valve (a safety valve). Therefore, when the pressure in the air chamber 1C exceeds a relief setting pressure, the supply/discharge valve 11 is temporarily switched from the valve-closed position (a) to the valve-opened position (b) as the relief valve even when being kept de-energized, and can release the excessive pressure at this time into the air duct 10.

The tank 12 storing the compressed air therein includes a connection pipe 12A made of, for example, a flexible hose. One end portion of this connection pipe 12A is detachably connected to the tank 12, and the other end portion thereof is connected to the tank-side suction conduit 13 and the tank conduit 15, which will be described below. The connection pipe 12A of the tank 12 is connected to the intake side 3A of the compressor 3 via the tank-side suction conduit 13 serving as a first passage. One end portion and the other end portion of this tank-side suction conduit 13 are connected to the tank 12 (the connection pipe 12A) and the intake conduit 5 at the position of the connection point 5A, respectively. In other words, the connection point 5A connects the intake conduit 5 to the tank-side suction conduit 13 so as to cause the tank-side suction conduit 13 to branch off from the intake conduit 5 at a position located between the intake side 3A of the compressor 3 and the intake valve 9.

The intake electromagnetic valve 14 is provided in the tank-side suction conduit 13. The intake electromagnetic valve 14 is used to supply the compressed air in the tank 12 to the intake side 3A of the compressor 3 or stop this supply. This intake electromagnetic valve 14 is formed by, for example, a two-port and two-position electromagnetic switching valve (a solenoid valve). The intake electromagnetic valve 14 is normally placed at a valve-closed position (c), and is switched from the valve-closed position (c) to a valve-opened position (d) when being energized according to a control signal from the controller 22. Further, the intake electromagnetic valve 14 has a function as a relief valve (a safety valve) similarly to the above-described supply/discharge valve 11.

The intake electromagnetic valve 14 is an ON/OFF-type two-way electromagnetic valve having the valve-closed position (c) and the valve-opened position (d), and can be embodied by employing a highly versatile electromagnetic switching valve and eliminate the necessity of an expensive valve such as a three-way electromagnetic valve. The return electromagnetic valve 16 and the discharge electromagnetic valve 20, which will be described below, can also be embodied by employing a highly versatile two-way electromagnetic valve similarly to the intake electromagnetic valve 14.

Further, the connection pipe 12A of the tank 12 is connected to the discharge side 3B of the compressor 3 via the tank conduit 15 serving as a second passage. One end portion of this tank conduit 15 is connected to the tank 12 (the connection pipe 12A), and the other end portion thereof is connected so as to branch off from the supply/discharge conduit 6 at the position of the connection point 6B. In other words, the connection point 6B connects the supply/discharge conduit 6 to the tank conduit 15 so as to cause the tank conduit 15 to branch off from the supply/discharge conduit 6 at a position located between the slow-return valve 8 and the supply/discharge switching valve 17.

The return electromagnetic valve 16 is provided in the tank conduit 15. The return electromagnetic valve 16 serves as a return valve for supplying the compressed air in the tank 12 so as to return it into the supply/discharge conduit 6 or stopping this supply. This return electromagnetic valve 16 is formed by, for example, a two-port, two-position, and two-way electromagnetic valve (a solenoid valve). The return electromagnetic valve 16 is normally placed at a valve-closed position (e), and is switched from the valve-closed position (e) to a valve-opened position (f) when being energized according to a control signal from the controller 22. When the return electromagnetic valve 16 is opened, for example, the compressed air in the air suspension 1 can be accumulated so as to be returned into the tank 12 via the tank conduit 15. Further, the return electromagnetic valve 16 has a function as a relief valve (a safety valve) similarly to the above-described supply/discharge valve 11.

The supply/discharge switching valve 17 forms the fourth valve provided in the fourth passage connecting the air drier 7 and the air suspension 1 (for example, a part of the supply/discharge conduit 6 and the air duct 10). Now, the supply/discharge switching valve 17 is a valve that selectively connects the air duct 10 on the air suspension 1 side to the supply/discharge conduit 6 or the return flow conduit 18, and is formed by, for example, a three-port and two-position electromagnetic directional switching valve (i.e., a three-way electromagnetic valve). More specifically, the supply/discharge switching valve 17 is selectively switched to a supply/discharge position (g), at which the compressed air generated in the compressor 3 is supplied to the air chamber 1C of the air suspension 1 or the compressed air in the air chamber 1C is discharged via the supply/discharge conduit 6, and a return flow position (h), at which the compressed air in the air chamber 1C is returned to the intake side 3A of the compressor 3 via the return flow conduit 18.

The return flow conduit 18 is a bypass passage provided so as to bypass the compressor 3, the supply/discharge conduit 6, the air drier 7, and the slow-return valve 8, and one end portion thereof is configured connectably to the air duct 10 on the air suspension 1 side via the supply/discharge switching valve 17. The other end portion of the return flow conduit 18 is connected to the intake conduit 5 at the position of the connection point 5A. Therefore, when the supply/discharge switching valve 17 is switched to the return flow position (h), the return flow conduit 18 allows the compressed air discharged from the air chamber 1C of the air suspension 1 to return to the intake side 3A of the compressor 3 so as to bypass the supply/discharge conduit 6.

The discharge conduit 19 is a third passage for discharging the compressed air in the supply/discharge conduit 6 outward, and the discharge electromagnetic valve 20 is provided on the way thereof. One end portion of the discharge conduit 19 is connected to the supply/discharge conduit 6 at the position of the connection point 6A. The other end portion of the discharge conduit 19 is configured to serve as the discharge port 19A and extends to outside the compressor device 2, and the distal end of the discharge port 19A is opened to the external air.

The discharge electromagnetic valve 20 as the discharge valve is provided in the discharge conduit 19 serving as the third passage. This discharge electromagnetic valve 20 is formed by, for example, a two-port, two-position, and two-way electromagnetic valve (a solenoid valve). The discharge electromagnetic valve 20 is normally placed at a valve-closed position (i), and is switched from the valve-closed position (i) to a valve-opened position (j) when being energized according to a control signal from the controller 22.

When the discharge electromagnetic valve 20 is opened, the compressed air in the air suspension 1 can be discharged (released) from the discharge port 19A outward via the supply/discharge conduit 6, the orifice 8A of the slow-return valve 8, the air drier 7, and the discharge conduit 19. Further, when the discharge electromagnetic valve 20 is opened, the compressed air in the tank 12 can also be discharged (released) from the discharge port 19A outward via the tank conduit 15, the return electromagnetic valve 16, the supply/discharge conduit 6, the orifice 8A of the slow-return valve 8, the air drier 7, and the discharge conduit 19. Further, the discharge electromagnetic valve 20 has a function as a relief valve (a safety valve) similarly to the above-described supply/discharge valve 11.

Further, a pressure detector 21 is provided in the air duct 10 at, for example, a position located between each branch pipe 10A and the supply/discharge switching valve 17. This pressure detector 21 detects the pressure in the tank 12 via the tank conduit 15 when, for example, the return electromagnetic valve 16 is switched from the valve-closed position (e) to the valve-opened position (f) in a state that all of the supply/discharge valves 11, the intake electromagnetic valve 14, and the discharge electromagnetic valve 20 are closed and the supply/discharge switching valve 17 is returned to the supply/discharge position (g). Further, when, for example, at least any of the supply/discharge valves 11 is opened in a state that the intake electromagnetic valve 14, the return electromagnetic valve 16, and the discharge electromagnetic valve 20 closed, the pressure in the air chamber 1C of the corresponding air suspension 1 can be detected by the pressure detector 21.

The controller 22 as a control unit is formed by, for example, a microcomputer or the like. The pressure detector 21, a plurality of vehicle height sensors 23 (i.e., FL-side, FR-side, RL-side, and RR-side vehicle height sensors 23), a selection switch 24, and the like are connected to the input side of the controller 22. The FL-side, FR-side, RL-side, and RR-side vehicle height sensors 23 individually detect the vehicle heights due to the respective air suspensions 1 on the front left wheel (FL), front right wheel (FR), rear left wheel (RL), and rear right wheel (RR) sides of the vehicle, respectively. The selection switch 24 is an operation switch that switches, for example, an automatic mode applied when the vehicle height is adjusted, and a selection mode in which the driver arbitrarily changes the vehicle height according to the driver's preference.

Then, when the driver makes the selection so as to adjust the vehicle height in the automatic mode by operating the selection switch 24, the controller 22 compares (determines) whether the respective air suspensions 1 are higher or lower compared to a setting height serving as a target vehicle height based on vehicle height detection signals output from the FL-side, FR-side, RL-side, and RR-side vehicle height sensors 23. The controller 22 is configured to individually adjust the vehicle heights with use of the respective air suspensions 1 on the front left wheel (FL), front right wheel (FR), rear left wheel (RL), and rear right wheel (RR) sides of the vehicle based on a result of this comparison (determination).

The output side of the controller 22 is connected to the electric motor 4 of the compressor 3, the supply/discharge valves 11 on the FL side, the FR side, the RL side, and the RR side, the intake electromagnetic valve 14, the return electromagnetic valve 16, the supply/discharge switching valve 17, the discharge electromagnetic valve 20, and the like. Further, the controller 22 is connected to another controller (not illustrated) via, for example, a CAN (Controller Area Network), which is a communication line network required for data communication. Due to this connection, the controller 22 can input and output various kinds of vehicle information including, for example, the external temperature (the ambient temperature), date and time information, and load information such as a load weight between the controller 22 and the other controller.

Further, the controller 22 includes a memory 22A embodied by a ROM, a RAM, a nonvolatile memory, or the like. This memory 22A stores therein, for example, a program for performing control processing for the vehicle height adjustment illustrated in FIG. 3, and a determination processing map for determining whether it is time to perform processing for regenerating the air drier 7. More specifically, failing to perform the regeneration processing regularly makes it impossible for the moisture absorbent of the air drier 7 to exert its intended function with the absorbed moisture reaching the saturated state. Therefore, the memory 22A stores in advance what time, how many times, and the like the compressor 3 absorbs the external air, and the controller 22 performs the processing for determining the timing of performing the processing for regenerating the air drier 7 like step 7 illustrated in FIG. 3 by carrying out a map calculation or the like based on this stored content.

The controller 22 controls the driving of the electric motor 4 and also outputs the control signal to each of the supply/discharge valves 11, the intake electromagnetic valve 14, the return electromagnetic valve 16, the supply/discharge switching valve 17, the discharge electromagnetic valve 20, and the like to individually energize or de-energize these valves 11, 14, 16, 17, and 20 (more specifically, each of the solenoids) based on the signals from each of the vehicle height sensors 23, the selection switch 24, and the like. Due to this control, the supply/discharge valve 11 is switched to any of the illustrated valve-closed position (a) and the valve-opened position (b), and the intake electromagnetic valve 14, the return electromagnetic valve 16, the supply/discharge switching valve 17, and the discharge electromagnetic valve 20 each are also switched to any of these positions.

The air suspension apparatus according to the first embodiment is configured in the above-described manner, and the operation thereof will be described referring to an example when the selection switch 24 is switched so as to adjust the vehicle height in the automatic mode.

Figure 3:
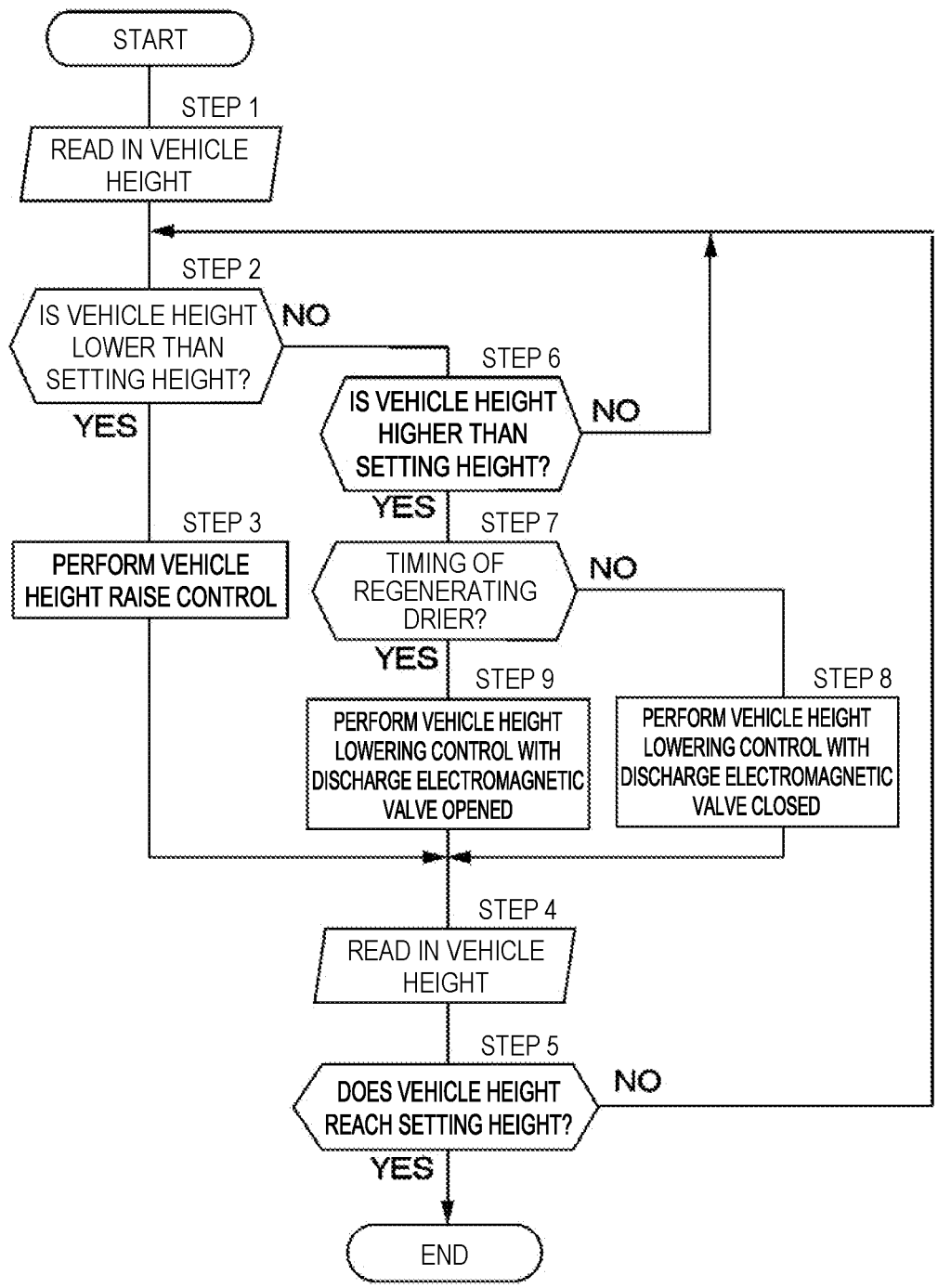
FIG. 3 is a flowchart illustrating processing for controlling a vehicle height adjustment by the controller.

As illustrated in FIG. 3, when the processing for controlling the vehicle height adjustment by the controller 22 is started, in step 1, the controller 22 reads in the vehicle height based on the detection signal from the vehicle height sensor 23. In the next step, step 2, the controller 22 determines whether the vehicle height at this time is lower than the setting height (the target height) according to the above-described automatic mode. If determining "YES" in step 2, in step 3, the controller 22 performs vehicle height raise control so as to raise the vehicle height to the setting height.

Figure 4:
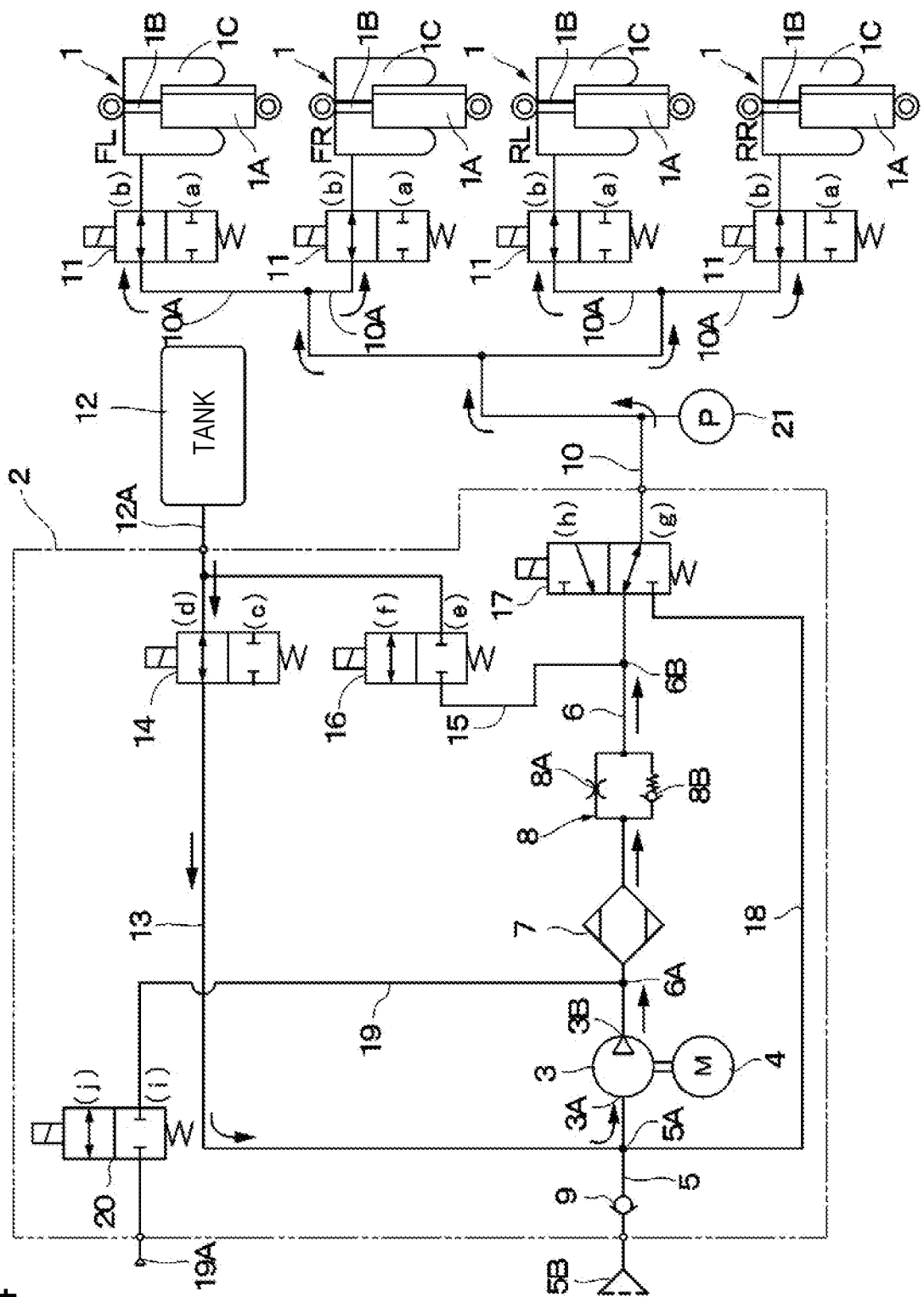
FIG. 4 is a circuit diagram of the air suspension apparatus illustrating a control state of raising the vehicle height by sucking compressed air from a tank.

FIG. 4 illustrates a specific example of the vehicle height raise control. More specifically, the controller 22 switches the intake electromagnetic valve 14 from the valve-closed position (c) to the valve-opened position (d) to control it into the valve-opened state and drives the compressor 3 by the electric motor 4, and also switches the supply/discharge valve 11 of the air suspension 1 to the valve-opened position (b). FIG. 4 illustrates the example when the vehicle height raise control is performed on all of the air suspensions 1 of the four wheels. This merely indicates a representative example, and the controller 22 may be configured to perform the vehicle height raise control on at least any one air suspension 1 among the air suspensions 1 of the four wheels.

By the above-described switching control, the compressed air in the tank 12 flows out into the tank-side suction conduit 13 along arrows illustrated in FIG. 4, and is sucked via the intake side 3A along with the operation of the compressor 3. Then, the compressed air discharged from the discharge side 3B of the compressor 3 is supplied to the air chamber 1C of the air suspension 1 via the air drier 7, the check valve 8B of the slow-return valve 8, and the supply/discharge switching valve 17 along arrows illustrated in FIG. 4. As a result, the air suspension 1 can drive the vehicle height in the upward direction. In this manner, when the vehicle height is raised, the air compressed by the compressor 3 is dried by passing through the air drier 7, and the compressed air in the dried state is supplied into the air chamber 1C of the air suspension 1.

In this case, the compressor 3 can generate compressed air having a further high pressure at the discharge side 3B while sucking the compressed air stored in the tank 12 from the intake side 3A, and can quickly supply this compressed air into the air chamber 1C of the air suspension 1. In other words, the compressor 3 can generate compressed air having a further high pressure by sucking the pre-compressed compressed air in the tank 12 instead of the air in the atmospheric-pressure state, thereby being able to reduce the time taken to increase the pressure of the compressed air and thus allow the air chamber 1C of the air suspension 1 to extend (rise) early.

During that, the compressed air in the tank 12 is sucked into the intake side 3A of the compressor 3, and therefore the pressure in the tank 12 gradually reduces. Even if the inner pressure in the tank 12 starts to exhibit a negative-pressure tendency in this state, the compressor 3 can continue the compression operation thereof because the intake valve 9 (the check valve) is automatically opened. In other words, the intake valve 9 is set so as to be opened, for example, when the connection point 5A side has a pressure equal to or lower than the atmospheric pressure, by which the compressor 3 can secure the necessary suction air amount by sucking air insufficient for the compression from the intake port 5B.

Therefore, the compressor 3 can supply the compressed air to the air chamber 1C of the air suspension 1 via the supply/discharge conduit 6, the air drier 7, and the supply/discharge switching valve 17 while sucking the air from the external air via the intake port 5B and the intake conduit 5. Even if the intake electromagnetic valve 14 is closed by being returned to the valve-closed position (c) in the state of the vehicle height raise control illustrated in FIG. 4, the compressor 3 can suck the air from the external air via the intake port 5B and the intake conduit 5 while compressing it, thereby supplying the compressed air to the air chamber 1C of the air suspension 1 via the supply/discharge conduit 6, the air drier 7, and the supply/discharge switching valve 17.

In the next step, step 4, the controller 22 reads in the vehicle height based on the detection signal from the vehicle height sensor 23. In the next step, step 5, the controller 22 determines whether the vehicle height at this time reaches the target height (the setting height). If determining "YES" in step 5, the controller 22 ends the vehicle height adjustment processing, assuming that the vehicle height raise control is completed because the vehicle height reaches the target setting height. On the other hand, if determining "NO" in step 5, the controller 22 returns to the above-described step, step 2, and continues the processing subsequent thereto.

On the other hand, if determining "NO" in step 2, in the next step, step 6, the controller 22 determines whether the vehicle height is higher than the setting height (the target height) because the vehicle height has been determined to be equal to or higher than the setting height. When the controller 22 determines "YES" in step 6, this indicates that the vehicle height is supposed to be lowered by discharging the compressed air from the air chamber 1C of the air suspension 1. Therefore, in the next step, step 7, the controller 22 determines whether it is time to regenerate the air drier 7. When the controller 22 determines "NO" in step 7, this indicates that the processing for regenerating the air drier 7 does not have to be performed. Therefore, in the next step, step 8, the controller 22 performs vehicle height lowering control as illustrated in FIG. 5 while keeping the discharge electromagnetic valve 20 closed.

Figure 5:
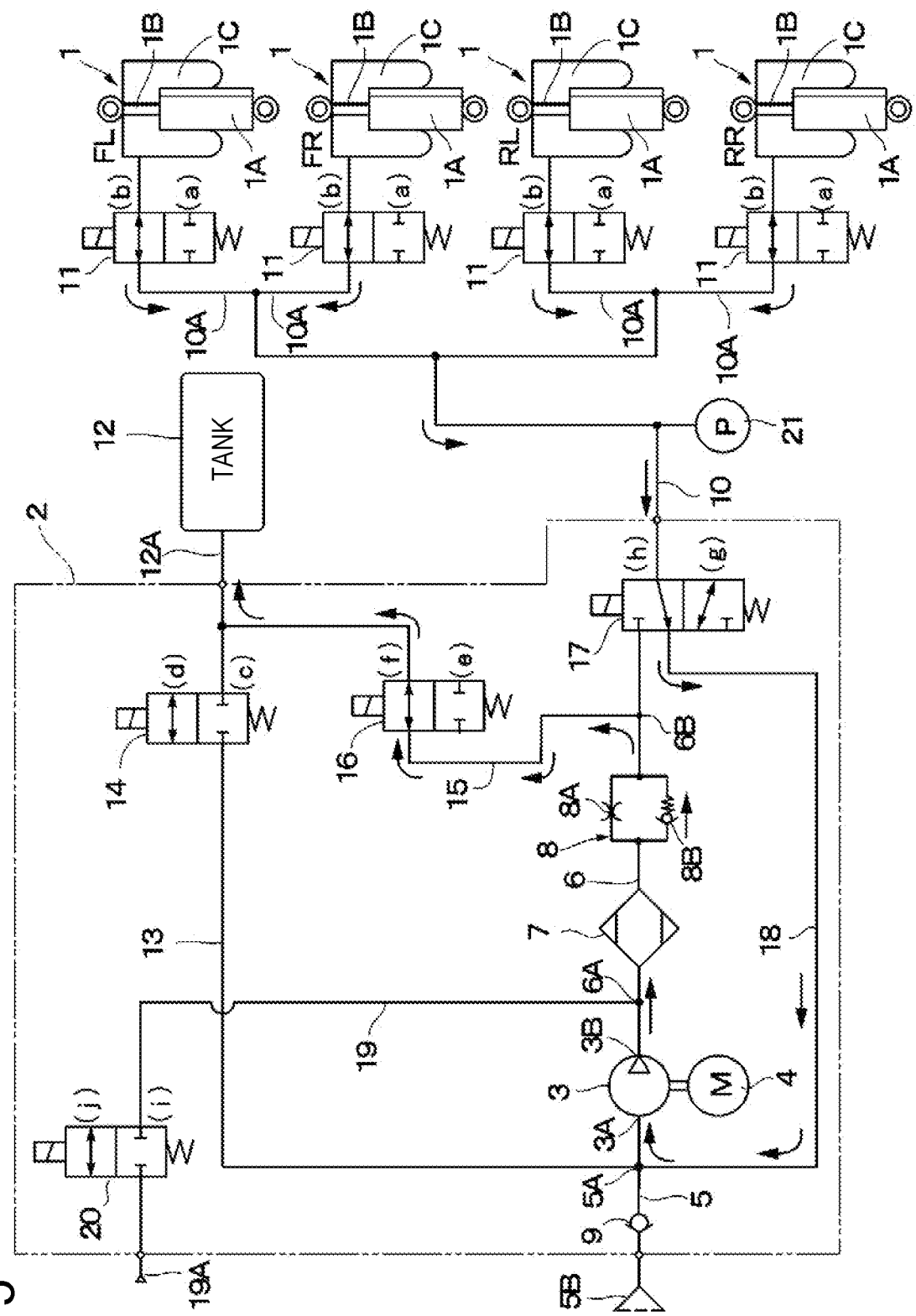
FIG. 5 is a circuit diagram of the air suspension apparatus illustrating a state of lowering the vehicle height by discharging the compressed air from the air suspension toward the tank so as to accumulate the pressure.

In the vehicle height lowering control illustrated in FIG. 5, the controller 22 switches the supply/discharge valve 11 of the air suspension 1 from the valve-closed position (a) to the valve-opened position (b) to control it into the valve-opened state and switches the supply/discharge switching valve 17 from the supply/discharge position (g) to the return flow position (h), and also drives the compressor 3 by the electric motor 4 and switches the return electromagnetic valve 16 from the valve-closed position (e) to the valve-opened position (f). Due to this control, the compressed air in the air suspension 1 (the air chamber 1C) flows out from each branch pipe 10A (the air conduit 10) to the return flow conduit 18 via the supply/discharge switching valve 17 as indicated by arrows illustrated in FIG. 5, and is sucked from the intake side 3A along with the operation of the compressor 3.

Then, the compressed air discharged from the discharge side 3B of the compressor 3 is loaded so as to be released into the tank 12 via the air drier 7, the check valve 8B of the slow-return valve 8, the tank conduit 15, and the return electromagnetic valve 16. In sum, the vehicle height can be lowered by forcibly releasing the compressed air in the air suspension 1 (the air chamber 1C) into the tank 12 to thus shrink the air chamber 1C of the air suspension 1.

After that, in the above-described step, step 4, the controller 22 reads in the vehicle height based on the detection signal from the vehicle height sensor 23. In step 5, the controller 22 determines whether the vehicle height at this time reaches the target vehicle height (the setting height). If determining "YES" in step 5, the controller 22 ends the processing, assuming that the vehicle height lowering control is completed because the vehicle height reaches the target setting height. At this time, the electric motor 4 of the compressor 3 can stop the driving for suspending the compression operation. On the other hand, if determining "NO" in step 5, the controller 22 returns to the above-described step, step 2, and continues the processing subsequent thereto.

On the other hand, if the controller 22 determines "YES" in step 7, this means that it is time to perform the processing for regenerating the air drier 7, and the moisture absorbent of the air drier 7 would become unable to exert its intended function with the absorbed moisture reaching the saturated state if being left untreated in this state. Therefore, in the next step, step 9, the controller 22 opens the discharge electromagnetic valve 20 to perform the processing for regenerating the air drier 7, thereby performing vehicle height lowering control as illustrated in FIG. 6.

Figure 6:
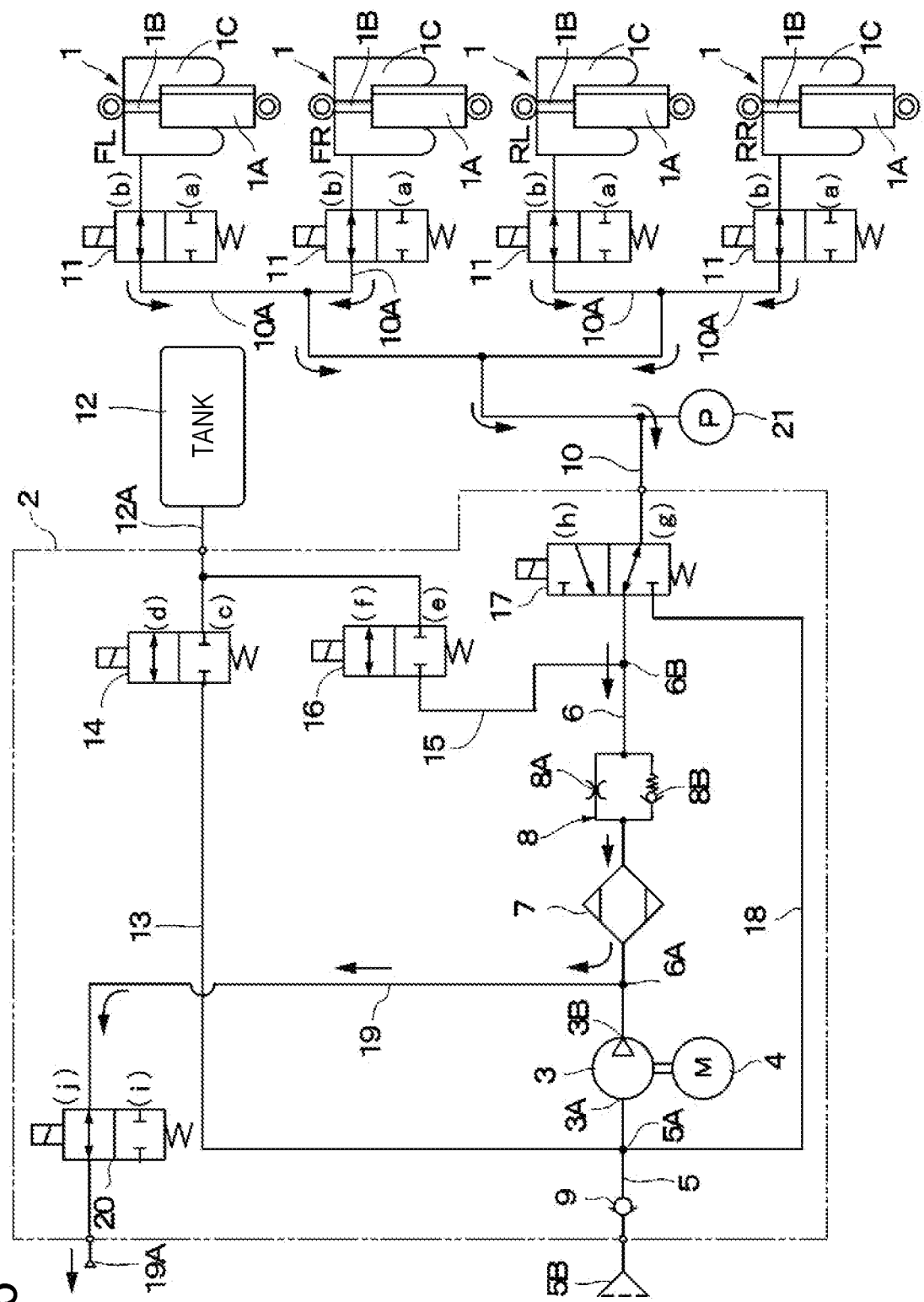
FIG. 6 is a circuit diagram of the air suspension apparatus illustrating a state of discharging the compressed air from the air suspension outward to lower the vehicle height and regenerating an air drier.

In the vehicle height lowering control illustrated in FIG. 6, the controller 22 switches the supply/discharge valve 11 of the air suspension 1 from the valve-closed position (a) to the valve-opened position (b) to control it into the valve-opened state and also switches the discharge electromagnetic valve 20 from the valve-closed position (i) to the valve-opened position (j) with the supply/discharge switching valve 17 returned to the supply/discharge position (g). At this time, the electric motor 4 of the compressor 3 is stopped to drive the compressor 3 so as to suspend the compression operation.

Due to this control, the compressed air in the air suspension 1 (the air chamber 1C) flows backward from each branch pipe 10A (the air duct 10) inside the supply/discharge conduit 6 and the air drier 7 via the supply/discharge switching valve 17 and is further discharged directly from the discharge port 19A to the external air via the supply/discharge conduit 19 and the discharge electromagnetic valve 20 as indicated by arrows illustrated in FIG. 6.

In this case, the slow-return valve 8 provided on the way of the supply/discharge conduit 6 is brought into the state that the check valve 8B is closed, thereby leading to a slow backward flow of the compressed air in the air drier 7 at a low flow rate because the compressed air flowing backward along the arrows illustrated in FIG. 6 is subjected to a reduction in the flow rate by the orifice 8A. Therefore, when the compressed air (exhaust air) discharged from the air suspension 1 (the air chamber 1C) flows in the backward direction in the air drier 7 (the supply/discharge conduit 6), the dried air flows backward in the air drier 7 and therefore the moisture is desorbed from the moisture absorbent in the air drier 7 due to this dried air. As a result, the moisture absorbent in the air drier 7 is regenerated, and is returned to the state capable of absorbing moisture again.

In other words, the compressed air discharged from the air suspension 1 (the air chamber 1C) at this time flows backward in the air drier 7 via the supply/discharge conduit 6, and therefore the moisture absorbent of the air drier 7 is regenerated due to the passage of the dried air of the air suspension 1 therethrough and the air drier 7 can be efficiently regenerated. As a result, the air suspension apparatus can lower the vehicle height at a high speed when lowering the vehicle height by shrinking the air chamber 1C of the air suspension 1, and also realize the processing for efficiently regenerating the air drier 7.

In this case, the controller 22 also reads in the vehicle height in step 4. Then, if determining that the vehicle height reaches the setting height in step 5, the controller 22 stops the vehicle height lowering operation by the air suspension 1 and ends the vehicle height adjustment processing. More specifically, if determining that the vehicle height reaches the target vehicle height in step 5 based on the detection signal from the vehicle height sensor 23, the controller 22 outputs the control signal for de-energizing the solenoid of the supply/discharge valve 11 to return the supply/discharge valve 11 to the valve-closed position (a) so as to end the vehicle height adjustment operation. As a result, the supply/discharge conduit 6 of the compressor 3 is closed toward the air chamber 1C of the air suspension 1, and therefore the air suspension 1 functions as a pneumatic spring for maintaining the target vehicle height and can be kept in the state maintaining the target vehicle height (the setting height).

In this manner, the air suspension apparatus according to the first embodiment includes the compressor 3 configured to compress the air, the tank 12 configured to store the air, the tank-side suction conduit 13 (the first passage) configured to supply the compressed air in this tank 12 to the suction side 3A of the compressor 3, the tank conduit 15 (the second passage) connecting the discharge side 3B of the compressor 3 and the tank 12, the air suspension 1 connected to the discharge side 3B of the compressor 3 via the air drier 7, the first valve (the intake electromagnetic valve 14) provided in the first passage (the tank-side suction conduit 13), the second valve (the return electromagnetic valve 16) provided in the second passage (the tank conduit 15), and the discharge conduit 19 (the third passage) provided so as to branch off from between the discharge side 3B of the compressor 3 and the air drier 7 and configured to be connected to the atmosphere by opening the discharge electromagnetic valve 20 (the third valve). The air drier 7 can be regenerated via the compressed air in the air suspension 1 by closing the first valve and the second valve and opening the third valve.

Therefore, the air suspension apparatus can discharge the compressed air from the air suspension 1 to the atmosphere to then regenerate the air drier 7 by opening the discharge electromagnetic valve 20 (a third valve) with the intake electromagnetic valve 14 (a first valve) and the return electromagnetic valve 16 (a second valve) closed. Then, when the pressure in the air suspension 1 is lower than the pressure in the tank 12, the air suspension apparatus can efficiently regenerate the air drier 7 and reduce the regeneration frequency. As a result, the air suspension apparatus allows the compressor 3 to be driven for a shorter time in the drier regeneration process.

Further, the intake electromagnetic valve 14 (the first valve), the return electromagnetic valve 16 (the second valve), and the discharge electromagnetic valve 20 (the third valve), which are provided between the compressor 3 and the tank 12, can be formed with use of, for example, an ON/OFF-type highly versatile and inexpensive electromagnetic switching valve (a two-way electromagnetic valve). Therefore, the air suspension apparatus can be prepared as a low-cost system compared to, for example, the conventional technique discussed in PTL 1. In other words, in the conventional technique, the connection between the intake side/the discharge side of the compressor and the tank is established via a three-way electromagnetic valve.

On the other hand, in the present embodiment, the connection between the intake side 3A/the discharge side 3B of the compressor 3 and the tank 12 is established via the intake electromagnetic valve 14 and the return electromagnetic valve 16, which are each formed by, for example, an ON/OFF-type two-way electromagnetic valve. Then, when the intake electromagnetic valve 14 and the return electromagnetic valve 16 are closed (with the solenoid de-energized), the tank 12 is disconnected from the compressor 3 and the air suspension 1, which reliably reduces the risk of an air leak of the compressed air stored (accumulated) in the tank 12. As a result, the air suspension apparatus can reduce the number of times that the external air is compressed by the compressor 3, thereby eventually reducing the frequency of regenerating the air drier 7.

Further, the air suspension apparatus can directly supply the compressed air to the air suspension 1 to adjust the vehicle height by sucking the external air by the compression 3 regardless of the pressure in the tank 12. Therefore, under such a situation that the tank pressure is higher than the atmospheric pressure, the air suspension apparatus can load extra compressed air to the air suspension 1 from the external air and immediately perform the process for regenerating the air drier 7 from the air suspension 1, thereby creating an opportunity of regenerating the air drier 7.

In addition, the air suspension apparatus according to the first embodiment can store the compressed air in the tank 12 in advance, and can establish a closed circuit (the closed type) capable of supplying this compressed air stored in the tank 12 to the air suspension 1 while further compressing it by the compressor 3. Further, the air suspension apparatus can return and store in advance the compressed air discharged from the air chamber 1C of the air suspension 1 into the tank 12 with use of the return electromagnetic valve 16 without emitting it into the atmosphere, thereby making effective use of the compressed air instead of wastefully discharging it.

Further, the air suspension apparatus according to the first embodiment is configured in such a manner that the compressor 3 sucks and then compresses the compressed air in the tank 12, thereby being able to significantly reduce the frequency of sucking the air from the external atmosphere (i.e., the frequency of opening the intake valve 9), and thus reduce the frequency of failure occurrence due to suction of dust and moisture in the atmosphere. Further, compared to the conventional closed type, the air suspension apparatus according to the first embodiment does not necessarily require special execution of pressure control or the like using a pressure sensor or the like, thereby eliminating the necessity of complicated control and thus succeeding in simplifying the overall configuration.

Therefore, according to the first embodiment, the air suspension apparatus can prevent the saturation of the absorbent because the absorption of moisture by the air drier 7 and the regeneration of the air drier 7 can be appropriately carried out. Further, the air suspension apparatus can provide a closed-type system not requiring complicated control by the controller 22. In addition, the air suspension apparatus does not require a plurality of three-way electromagnetic valves unlike the conventional technique (PTL 1), thereby being able to provide a low-cost system. The air suspension apparatus can employ a highly versatile ON/OFF-type electromagnetic switching valve (a two-way electromagnetic valve) as each of the supply/discharge valve 11, the intake electromagnetic valve 14, the return electromagnetic valve 16, and the discharge electromagnetic valve 20, and can be constructed with use of the minimum number of them.

Further, according to the first embodiment, the normal use range as the air suspension apparatus is satisfied in the closed system, and therefore the vehicle height can be raised in a shorter time at the time of highly frequent use. Then, the air suspension apparatus can suck the atmosphere (open the intake valve 9) or emit the compressed air into the atmosphere (open the discharge electromagnetic valve 20) as necessary, only when the vehicle height adjustment range exceeds the normal use range.

Figure 2:
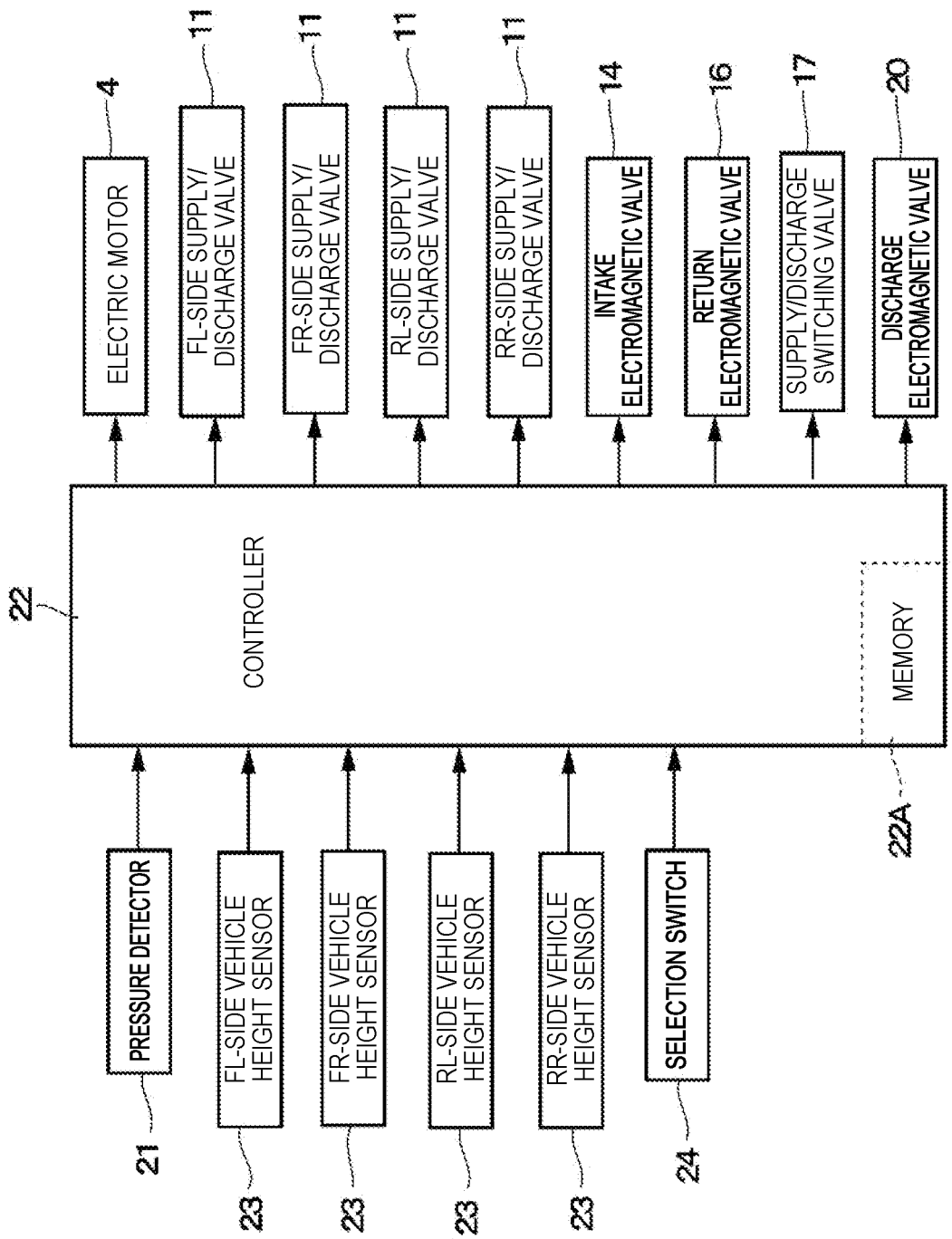
FIG. 2 is a control block diagram of the air suspension apparatus including a controller.

In the above-described first embodiment, the air suspension apparatus has been described referring to the example when the pressure in the air chamber 1C or the tank 12 is detected with use of the pressure detector 21 as illustrated in FIG. 2. However, the present invention is not limited thereto, and the air suspension apparatus may be configured to, for example, estimate the pressure in the air chamber 1C or the tank 12 based on how the vehicle height changes with use of the detection signal from the vehicle height sensor 23, and can eliminate the necessity of the pressure detector 21 in this case.

Figure 7:
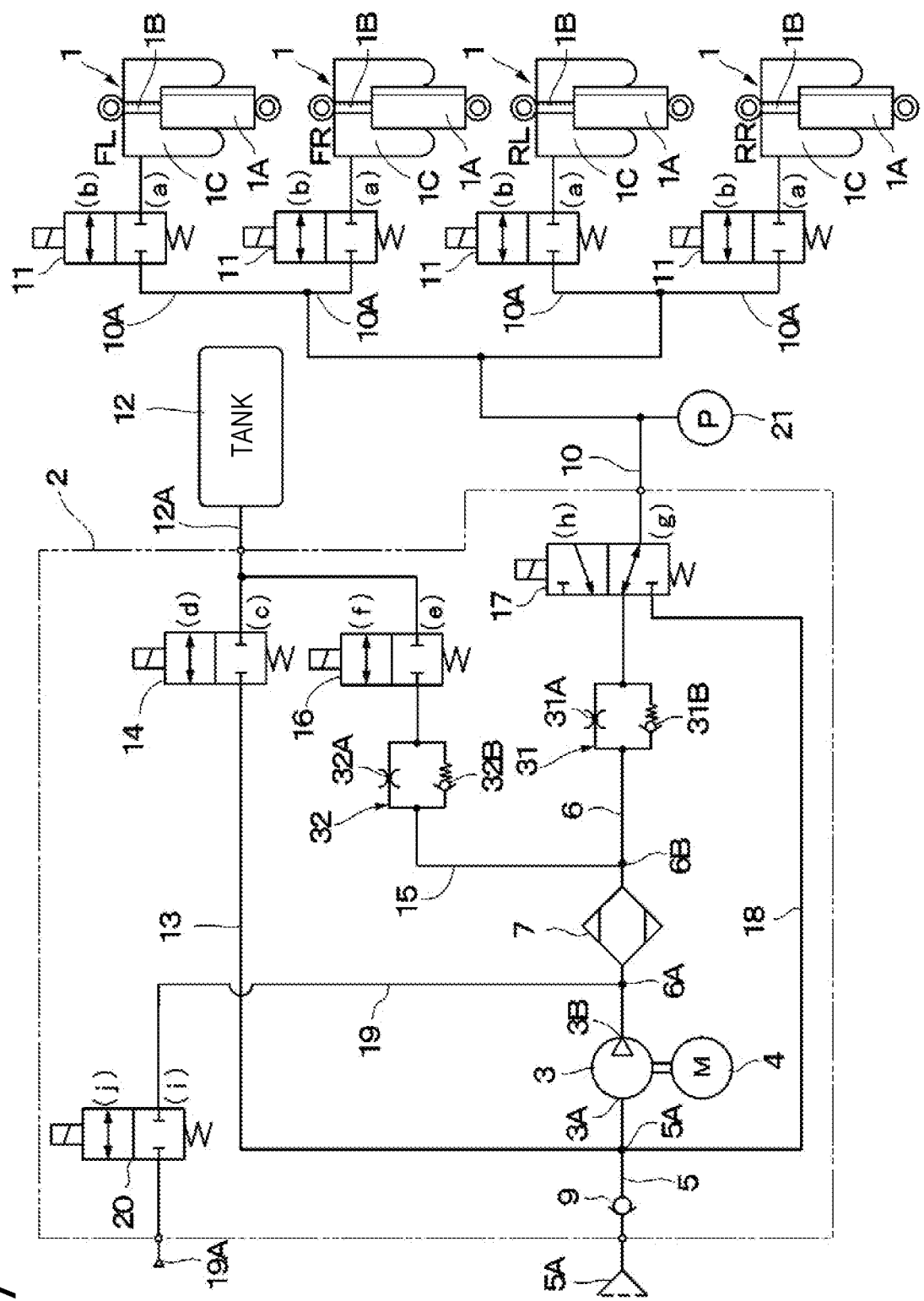
FIG. 7 is a circuit diagram illustrating the entire configuration of an air suspension apparatus according to a second embodiment.

Next, FIG. 7 illustrates a second embodiment. The present embodiment will be described, assigning similar reference numerals to similar components to the above-described first embodiment and omitting the descriptions thereof. However, the second embodiment is characterized by being configured in such a manner that a first orifice is provided between the air drier 7 and the fourth valve (the supply/discharge switching valve 17), a second orifice is provided between the air drier 7 and the second valve (the return electromagnetic valve 16), and the above-described first orifice has a larger orifice diameter than the above-described second orifice.

More specifically, a first slow-return valve 31 employed in the second embodiment is arranged between the connection point 6B of the supply/discharge conduit 6 and the supply/discharge switching valve 17. The first slow-return valve 31 is formed by a parallel circuit of an orifice 31A and a check valve 31B, similarly to the slow-return valve 8 described in the first embodiment. However, the orifice 31A in this case forms the first orifice provided on the way of the supply/discharge conduit 6.

Further, a second slow-return valve 32 employed in the second embodiment is arranged between the connection point 6B of the supply/discharge conduit 6 and the return electromagnetic valve 16 on the way of the tank conduit 15 (the second passage). The second slow-return valve 32 is formed by a parallel circuit of an orifice 32A and a check valve 32B, similarly to the slow-return valve 8 described in the first embodiment. However, the orifice 32A in this case forms the second orifice provided on the way of the supply/discharge conduit 15 (the second passage).

Then, the orifice 31A (the first orifice) has a larger orifice diameter than the orifice 32A (the second orifice), and the air amount flowing therein to regenerated the air drier 7 is set in such a manner that the air flows through the first orifice 31A at a relatively high flow rate compared to the second orifice 32A. According to this configuration, the compressed air flows (flows backward) in the first orifice 31A of the first slow-return valve 31 when the control for lowering the vehicle height is performed by opening the discharge electromagnetic valve 20 to discharge the compressed air from the air suspension 1 toward the discharge conduit 19.

At this time, the first orifice 31A can cause the regeneration air (dried air) to flow through the air drier 7 after adjusting the flow rate of the air flowing from the air suspension 1 toward the discharge conduit 19 to a required flow rate. Therefore, when regenerating the drier with the aid of the discharge into the atmosphere, the air suspension apparatus can efficiently regenerate the air drier 7 without slowing down the vehicle height adjustment speed and slowing down the vehicle height lowering speed.

On the other hand, the air suspension apparatus may open the return electromagnetic valve 16 and the discharge electromagnetic valve 20 to discharge the compressed air from the tank 12 toward the discharge conduit 19 for the purpose of discharging the compressed air in the tank 12. In this case, the air suspension apparatus can use the compressed air in the tank 12 as the air (the dried air) for regenerating the air drier 7 without adjusting the vehicle height (lowering the vehicle height). At this time, the second orifice 32A of the second slow-return valve 32 is formed so as to have a smaller orifice diameter than the first orifice 31A, and therefore can slow down the flow of the compressed air and reduce the flow rate thereof, thereby allowing the air drier 7 to be efficiently regenerated with the regeneration air (the dried air) flowing from the tank 12 toward the discharge conduit 19.

In this manner, according to the thus-configured second embodiment, the air suspension apparatus can also reduce a leak of the air in the tank 12 and efficiently perform the processing for regenerating the air drier 7 similarly to the above-described first embodiment. Especially, in the second embodiment, due to the second orifice 32A of the second slow-return valve 32 that is formed so as to have a smaller orifice diameter than the first orifice 31A, the air suspension apparatus can effectively regenerate the air drier 7 with the regeneration air (the dried air) flowing from the tank 12 toward the discharge conduit 19.

Figure 8:
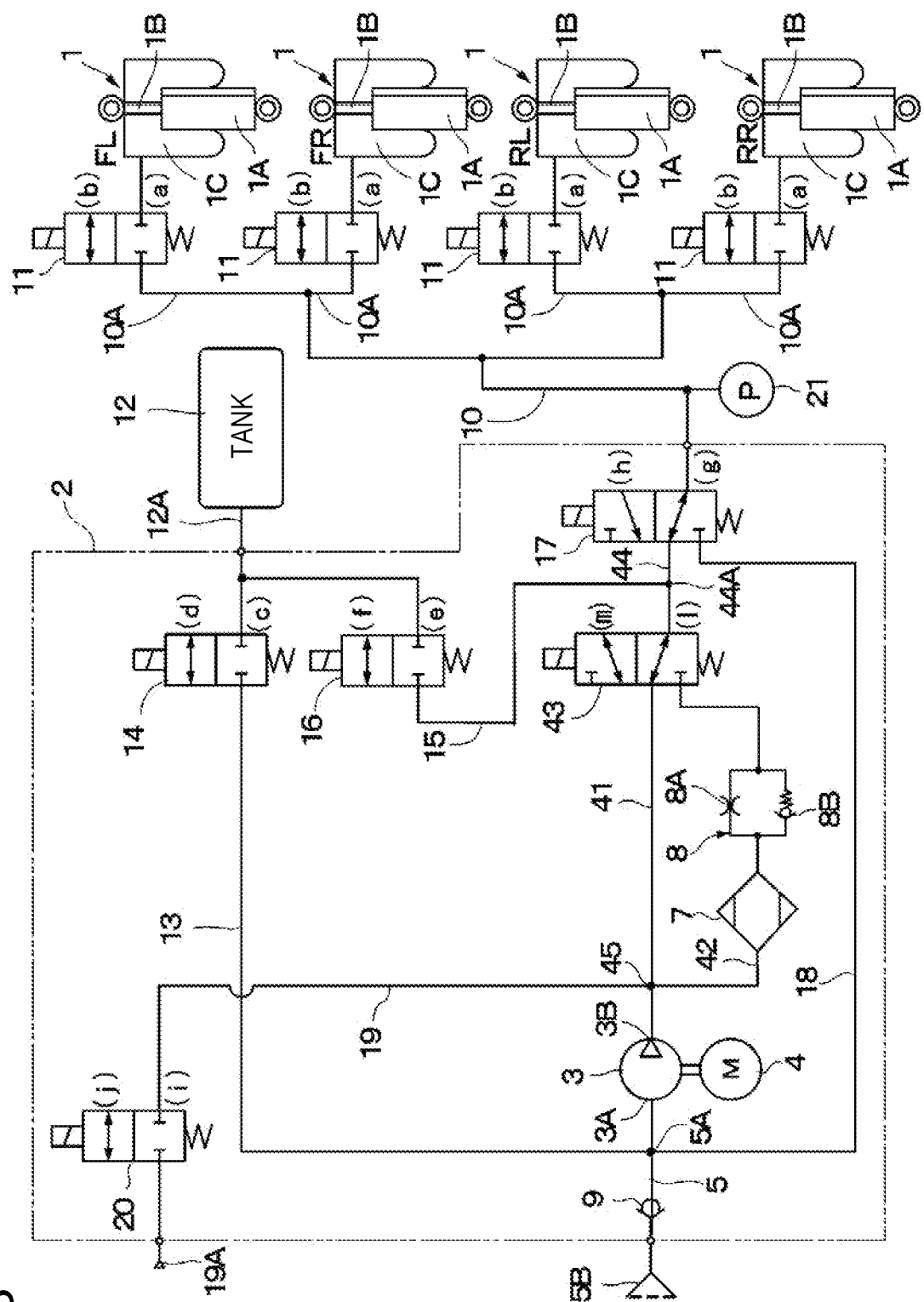
FIG. 8 is a circuit diagram illustrating the entire configuration of an air suspension apparatus according to a third embodiment.

Next, FIG. 8 illustrates a third embodiment. The present embodiment will be described, assigning similar reference numerals to similar components to the above-described first embodiment and omitting the descriptions thereof. However, the third embodiment is characterized by being configured in such a manner that the supply/discharge conduit (the fourth passage) provided between the discharge side 3B of the compressor 3 and the supply/discharge switching valve 17 is formed by first and second supply/discharge conduits 41 and 42 connected in parallel with each other and a third supply/discharge conduit 44 connected to any one of the first and second supply/discharge conduits 41 and 42 by a directional switching valve 43.

Then, one end portions of the first supply/discharge conduit 41 and the second supply/discharge conduit 42 branch or merge at a position of a connection point 45 and are connected to the discharge side 3B of the compressor 3 in constant communication therewith. Further, the third supply/discharge conduit 44 is provided between the supply/discharge switching valve 17 described in the first embodiment and the directional switching valve 43, and is connected to the tank conduit 15 at a position of a connection point 44A. The directional switching valve 43 is formed by a three-port and two-position electromagnetic directional switching valve (i.e., a three-way electromagnetic valve) similarly to the supply/discharge switching valve 17, and is switched to a first position (1) and a second position (m).

While the directional switching valve 43 is placed at the first position (1), the first supply/discharge conduit 41 is connected to the third supply/discharge conduit 44 and the second supply/discharge conduit 42 is disconnected from the third supply/discharge conduit 44. However, when the directional switching valve 43 is switched from the first position (1) to the second position (m), the first supply/discharge conduit 41 is disconnected from the third supply/discharge conduit 44 and the second supply/discharge conduit 42 is connected to the third supply/discharge conduit 44.

The air drier 7 and the slow-return valve 8 are not provided in the first supply/discharge conduit 41, and the air drier 7 and the slow-return valve 8 are provided in the second supply/discharge conduit 42 at positions between the connection point 45 and the directional switching valve 43. The discharge conduit 19 as the third passage is connected to the first supply/discharge conduit 41 and the second supply/discharge conduit 42 at, for example, the position of the connection point 45.

In this manner, according to the thus-configured third embodiment, the directional switching valve 43 is switched from the first position (1) to the second position (m) when the compressor 3 sucks the external air from the intake port 5B and generates the compressed air. Therefore, the first supply/discharge conduit 41 is disconnected from the third supply/discharge conduit 44 and the second supply/discharge conduit 42 is brought into communication with the third supply/discharge conduit 44. As a result, when the vehicle height is raised, the compressed air discharged from the compressor 3 is supplied in the dried state into the air chamber 1C of the air suspension 1 via the second supply/discharge conduit 42 (the air drier 7 and the slow-return valve 8) and the branch pipe 10A of the air duct 10.

Further, when the air drier 7 is regenerated with the dried air in the air suspension 1 (the air chamber 1C), the processing for regenerating the air drier 7 can be performed with the compressed air in the dried state and the vehicle height can be lowered by causing the dried air discharged from the air suspension 1 (the air chamber 1C) to flow backward through the second supply/discharge conduit 42, the slow-return valve 8, the air drier 7 with the directional switching valve 43 switched to the second position (m) and the discharge electromagnetic valve 20 opened.

On the other hand, at the time of the vehicle height adjustment other than the above-described case, the compressed air can be caused to flow via the first supply/discharge conduit 41 without passing through the second supply/discharge conduit 42 (the air drier 7 and the slow-return valve 8) and the vehicle height can be raised and lowered by causing the compressed air to flow out and in between the air suspension 1 (the air chamber 1C) and the tank 12 and driving the compressor 3 as necessary with the directional switching valve 43 returned to the first position (1). Then, at this time, because the compressed air does not flow through inside the second supply/discharge conduit 42 (the air drier 7 and the slow-return valve 8), the air suspension apparatus can reduce a pressure loss and reduce an energy loss derived from heat generation, thereby achieving energy saving.

In the above-described third embodiment, the air suspension apparatus has been described referring to the example when the pressure in the air chamber 1C or the tank 12 is detected with use of the pressure detector 21 as illustrated in FIG. 8. However, the present invention is not limited thereto, and the air suspension apparatus may be configured to, for example, estimate the pressure in the air chamber 1C or the tank 12 based on how the vehicle height changes with use of the detection signal from the vehicle height sensor 23, and can eliminate the necessity of the pressure detector 21 in this case. The same also applies to the above-described second embodiment.

Further, in each of the above-described embodiments, the air suspension apparatus has been described referring to the example when the intake port 5B and the discharge port 19A are separately provided to the compressor device 2 so as to be spaced apart from each other. However, the present invention is not limited thereto, and, for example, may employ such an intake/discharge port that the intake port also serves as the discharge port with the distal end side of the discharge conduit 19 connected to the intake conduit (for example, between the intake valve 9 and the intake port 5B).

Next, inventions included in the above-described embodiments will be described. That is, as a first configuration of the present invention, an air suspension apparatus includes a compressor configured to compress air, a tank configured to store the air, a first passage configured to supply the compressed air in this tank to a suction side of the compressor, a second passage connecting a discharge side of the compressor and the tank, an air suspension connected to the discharge side of the compressor via an air drier, a first valve provided in the first passage, a second valve provided in the second passage, and a third passage provided so as to branch off from between the discharge side of the compressor and the air drier and configured to be connected to an atmosphere by opening a third valve. The air drier can be regenerated via the compressed air in the air suspension by closing the first valve and the second valve and opening the third valve.

Further, as a second configuration, in the above-described first configuration, the compressed air compressed from the atmosphere is supplied to the air suspension without intervention of the tank according to an instruction from a control unit. As a third configuration, the above-described first configuration further includes a fourth passage connecting the air drier and the air suspension. A fourth valve is provided in the fourth passage.

As a fourth configuration, in the above-described first configuration, a first orifice is provided between the air drier and the fourth valve and a second orifice is provided between the air drier and the second valve, and the first orifice has a larger orifice diameter than the second orifice. As a fifth configuration, in any of the above-described first to fourth configurations, the first valve and the second valve are two-way electromagnetic valves.

The present invention shall not be limited to the above-described embodiments, and includes various modifications. For example, the above-described embodiments have been described in detail to facilitate a better understanding of the present invention, and the present invention shall not necessarily be limited to the configuration including all of the described features. Further, a part of the configuration of some embodiment can be replaced with the configuration of another embodiment. Further, some embodiment can also be implemented with a configuration of another embodiment added to the configuration of this embodiment. Further, each of the embodiments can also be implemented with another configuration added, deleted, or replaced with respect to a part of the configuration of this embodiment.

The present application claims priority under the Paris Convention to Japanese Patent Application No. 2018-178847 filed on Sep. 25, 2018. The entire disclosure of Japanese Patent Application No. 2018-178847 filed on Sep. 25, 2018 including the specification, the claims, the drawings, and the abstract is incorporated herein by reference in its entirety.

REFERENCE SIGNS LIST 1 air suspension
2 compressor device
3 compressor
4 electric motor
5 intake conduit
6 supply/discharge conduit (fourth passage)
7 air drier
8, 31, 32 slow-return valve
8A orifice
9 intake valve
10 air duct (fourth passage)
11 supply/discharge valve
12 tank
13 tank-side suction conduit (first passage)
14 intake electromagnetic valve (first valve)
15 tank conduit (second passage)
16 return electromagnetic valve (second valve)
17 supply/discharge switching valve (fourth valve)
18 return flow conduit
19 discharge conduit (third passage)
20 discharge electromagnetic valve (third valve)
21 pressure detector
22 controller (control unit)
23 vehicle height sensor
31A orifice (first orifice)
32 orifice (second orifice)
41 first supply/discharge conduit
42 second supply/discharge conduit
43 directional switching valve
44 third supply/discharge conduit

The invention claimed is:

1. An air suspension apparatus comprising:
a compressor configured to compress air;
a tank configured to store the air;
a first passage configured to supply the compressed air in the tank to a suction side of the compressor;
a second passage connecting a discharge side of the compressor and the tank;
an air suspension connected to the discharge side of the compressor via an air drier;
a first valve provided in the first passage;
a second valve provided in the second passage;
a third passage provided so as to branch off from between the discharge side of the compressor and the air drier and configured to be connected to an atmosphere by opening a third valve; and
a fourth passage connecting the air drier and the air suspension,
wherein a fourth valve is provided in the fourth passage,
wherein the compressed air in the tank is supplied into the air suspension by closing the second valve and the third valve and opening the first valve,
wherein the air drier can be regenerated via the compressed air in the air suspension by closing the first valve and the second valve and opening the third valve, and
wherein a first orifice is provided between the air drier and the fourth valve and a second orifice is provided between the air drier and the second valve, and the first orifice has a larger orifice diameter than the second orifice.

2. The air suspension apparatus according to claim 1, wherein air compressed by the compressor is supplied to the air suspension without intervention of the tank according to an instruction from a control unit.

3. The air suspension apparatus according to claim 2, wherein the first valve and the second valve are two-way electromagnetic valves.

4. The air suspension apparatus according to claim 1, wherein the first valve and the second valve are two-way electromagnetic valves.

* * * * *